Aug. 12, 1952     J. B. DYER     2,606,662
FILTER
Filed Jan. 22, 1949
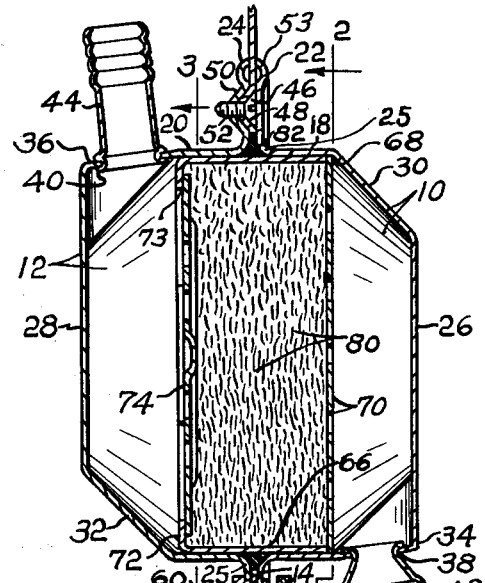
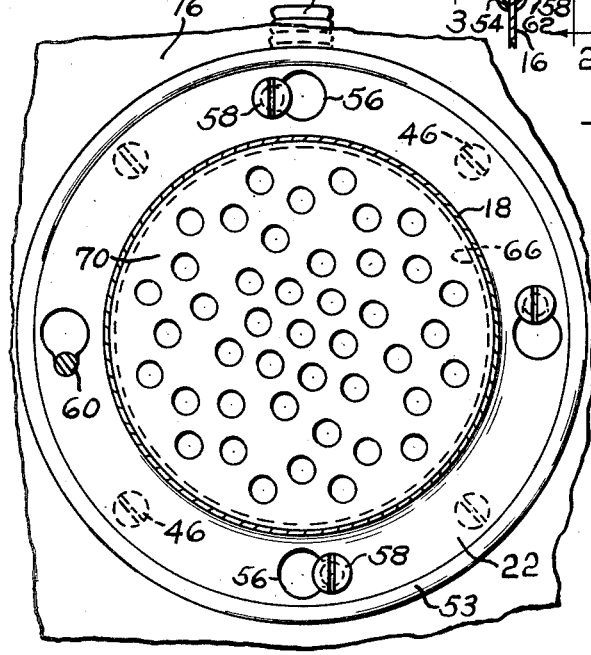
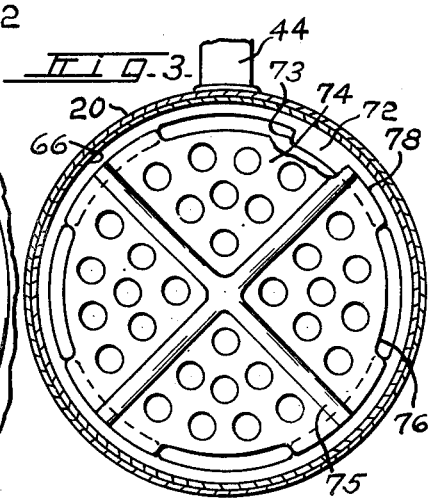
INVENTOR
JOHN B. DYER
BY *J. P. Kemper*
ATTORNEY Patented Aug. 12, 1952

2,606,662

UNITED STATES PATENT OFFICE 2,606,662

FILTER

John B. Dyer, Syracuse, N. Y., assignor to Easy Washing Machine Corporation, Syracuse, N. Y., a corporation of Delaware Application January 22, 1949, Serial No. 72,195

4 Claims. (Cl. 210—164)

This invention relates to filters, and more particularly to a filter construction readily adaptable for panel mounting and for use on washing machines and applications utilizing a low pressure discharge head.

In filters generally, it is desirable to provide a casing construction which may be readily opened from time to time for inspection and replacement of the filter material contained therein. In such filters, it is necessary to provide a seal between the parts, thus forming the filter casing, and where such filters are utilized adjacent an outlet subject to relatively low pressure, the structure of such seal may not be required to withstand any substantial pressure as long as the pressure drop across the filter remains low. However, as the filter material becomes plugged with swarf so as to block the passage of fluid therethrough, the casing becomes subjected to the full available pressure head to which the filter is connected, which in turn subjects the seal to such pressure. In a low pressure drop filter, having low outlet head pressure, flow is regulated on the inlet side by constricting means such as a valve, but as the filter becomes plugged, the filter itself acts as its own valve, thereby becoming subject to supply line pressure.

The present invention is directed toward the provision of a filter in which the seal between casing parts is never subjected to the pressure which may result from the plugging of the filter material, and in which the seal is always subject only to the outlet pressure head.

The invention is further directed to a separable filter casing in which one portion of the casing supports the filter medium independent of the other, and which is so constructed as to provide accessibility to the filter medium for inspection and replacement.

The invention is further directed to the provision of a filter construction which is relatively economical to manufacture and which may be readily taken apart for inspection and for access to and renewal of the filter material.

The invention is further directed to the provision of a removable filter material sustaining member which confines the filter material to one of the casing members such that when pressure builds up, such pressure is restricted to such casing member.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a transverse sectional view taken through a filter of the type described, mounted upon a panel;

Figure 2 is a section taken substantially on the line 2—2 of Figure 1; and

Figure 3 is a section with parts broken way, taken substantially on the line 3—3 of Figure 1.

Referring to Figure 1 of the drawing, there will be seen a pair of similiar separable filter casing members 10 and 12, mounted in an aperture 14 of a panel 16 of sheet metal or the like, which panel may be part of the physical structure of a washing machine or other appliance upon which it is desirable to mount the filter. Each of the casing members 10 and 12 is provided with a cylindrical body portion 18 and 20, respectively, and attachment flanges 22 and 24, respectively. Such flanges have rounded junctures 25 with respect to their respective body portions. The cylindrical body portions 18 and 20 are capped by domeshaped portions having flat ends 26 and 28 and conical connecting portions 30 and 32. The conical connecting portions 30 and 32 are deformed as at 34 and 36 to provide a suitable area for inlet and outlet apertures or connections 38 and 40, respectively, each of which is suitably provided with hose or pipe connecting nipples such as 42 and 44. The casing member 12 is secured to the panel 16 by a plurality of flat head screws 46 arranged in spaced relation around the periphery, the panel having countersunk apertures 48 for receiving the screws 46 and their respective heads, and the flange 24 is provided with mating depressions 50 having threaded apertures 52 in the center thereof to receive the screws 46. The marginal edges of the flanges 22 nd 24 may have circular stiffening ribs 53 and 55.

The casing member 10 is adapted to be secured to the front side of the panel 16 by bayonet and screw means, the construction utilized having circumferentially disposed pear or key hole shaped apertures 56 having an enlarged diameter sufficient to receive the knurled heads 58 of thumb screws 60, which thub screws are preferably provided with a collar 62 upon the shank portion of the screw. Such thumb screws are threaded into threaded members 64 which are riveted or otherwise fastened to the flange 24 of the casing member 12. The casing member 10 has positioned within the cylindrical portion 18 thereof a second cylindrical member 66 in telescopic arrangement therewith integrally secured thereto, which cylindrical portion is of a length substantially double the length of the cylindrical portion 18, so as normally to slidably extend into the cylindrical portion 20 of the casing member 12.

The cylindrical member 66 is provided at its edge 68 with a shoulder against which a perforated plate 70 may bear, the plate 70 being secured in position by such shoulder and the conical portion 30 of the dome end of the casing 10. The other end of the cylindrical member is provided with an interrupted inwardly extending flange 72 providing bayonet-like supporting surfaces 73 for a removable perforated plate 74, the peripheral edge of which is notched as at 76 to provide spaced lugs 78 which may be fitted behind the inwardly projecting portions of the flange 72. It will be seen that by rotation of the plate 74 with respect to the casing member 10, the lugs 78 may be brought to a position intermediate the inwardly projecting surfaces 73 of the flange 72 so that such plate 74 may be removed from the casing member 10. The plate may be provided with diametral stiffening ribs 75, to strengthen the plate against knuckling from pressure which may occur when the plate is in position and upon the filter becoming plugged.

In practice, the cylindrical member 66 will be filled with filter material such as cloth, gauze, cheesecloth, waste or other suitable filtering media, and the plate 74 placed in the position shown in Figures 1 and 3 by positioning and slight rotation to retain such filter material in place. It will appear that the filter material may be positioned in the casing 10 when the latter is removed from the panel 16 as by the loosening of thumb screws 58 and slight rotation of the flange 22 to permit such removal. The plate 74, when properly positioned when the casing 10 is so removed, retains the filter medium in place during reassembly and subsequent operation.

It will also appear that the cylindrical member 66 is suitably secured to the casing member 10, as by soldering or by spot welds extending between the cylinder member 66 and the cylindrical portion 18 of the casing member 10. The fit between the members will be sufficiently tight to be leak-proof or any suitable sealing medium may be interposed between the layers in the event the parts are not joined by soldering or fusion of the metal around the entire circumference.

The casing member 10, when properly supplied with filter medium held in place by the plate 66, may be assembled by telescopically inserting the cylindrical member into the casing member 12, thereafter slightly rotating the casing member 10 and tightening the thumb nuts 58. Fluid for filtering then may enter the inlet nipple 42, pass through the filter medium 80 and exit through the outlet nipple 44.

It will be seen that the pressure head drop will be determined by the type of filter material employed and the degree to which it is compressed within the casing 10. However, as such filter material, which may consist of three or four yards of unsized coarse mesh cotton gauze or cheesecloth, gradually becomes blocked by swarf in the form of sludge or other accumulated material filtered from the water after the passage of a substantial volume of water, the pressure within the dome of the casing member 10 will gradually increase and the pressure drop across the filter medium likewise increase. However, the pressure so developed will be borne by the plate 74 and the flange 72 carried by the cylinder member 66 and thus such pressure will be transmitted entirely to the casing member 10. It will thus be seen that the sealing ring 82, which may be conveniently located and confined between the convex rounded junctures 25 of the flanges 22 and 24, will not be subjected to any substantial pressure other than the outlet head pressure, and that the fastening screws 56 are likewise relieved of any substantial pressure other than that resulting from the outlet head pressure, in the casing member 12. Even though the filter material may become so plugged with swarf or sludge as to be practically imperforate, still the pressure upon the screws 58 and the seal 82 will remain subject only to the pressure on the outlet head within the casing member 12.

Thus, it will be seen that the casing member 10 may be readily removed when the filter becomes plugged, and that the screws 58 will not be under any tension or strain either at the time of such removal or during operation of the filter under plugged conditions. With such a construction, no jamming will occur, and it is not essential that the parts be replaced under any excessive stress, since leakage will not occur even under the lightest contact between the parts and the sealing ring 82 where the outlet head pressure is maintained low.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a filter, a pair of substantially symmetrical shell members each having a marginal flange and constituting inlet and outlet shell members, respectively, a compartment carried by the inlet shell member having a side wall integrally secured in sealed relation to the inlet shell member in leak-tight relationship, said compartment having a perforate inside end wall within the inlet shell member, and a removable outside perforate end wall detachably secured to said side wall by bayonet connecting means, said compartment projecting part way into the outlet shell member, a panel having an aperture to receive said compartment, having said outlet shell member secured thereto by its flange about said aperture, and detachable means for securing the inlet shell member upon said panel including a seal conjointly bearing against said flanges and compartment side wall.

2. In a filter, a pair of substantially symmetrical shell members each having a body portion and a marginal flange constituting inlet and outlet shell members, respectively, a compartment carried by the inlet shell member having a side wall integrally secured in sealed relation to the inlet shell member in leak-tight relationship, said compartment having a perforate inside end wall within the inlet shell member, and a removable outside perforate end wall detachably secured to said side wall by bayonet connecting means, said compartment projecting part way into the outlet shell member, detachable means for securing the inlet shell member flange to the outlet shell member flange, said flanges having a rounded juncture with their respective body portions whereby to provide a seal cavity bounded by the convex surfaces of the rounded junctures and compartment wall, and a seal ring conjointly bearing against the rounded junctures of said flanges and compartment side wall.

3. In a filter, a pair of substantially symmetrical shell members, each having a marginal flange, one of said shell members constituting an inlet shell member and the other an outlet shell member, a compartment carried by the inlet shell member having a side wall integrally secured to the inlet shell member in leak-tight relationship, said compartment having a perforate inside end wall within the inlet shell member, and a removable outside perforate end wall detachably secured to said side wall, said compartment projecting part way into the outlet shell member, a panel for supporting said shell members, having an aperture larger than the portion of the compartment projecting into the outlet member, said panel having secured thereto the flange of the outlet shell adjacent the marginal edge of the aperture, detachable means for securing the inlet shell member flange to said panel, and a seal located within said aperture and conjointly bearing against said flanges and compartment side wall.

4. In a filter, a pair of substantially symmetrical shell members, each having a body portion and a marginal flange, one of said shell members constituting an inlet shell member and the other an outlet shell member, a compartment carried by the inlet shell member having a side wall integrally secured to the inlet shell member in leak-tight relationship, said compartment having a perforate inside end wall within the inlet shell member, and a removable outside perforate end wall detachably secured to said side wall, said compartment projecting part way into the outlet shell member, detachable means for securing the inlet shell member flange to said outlet shell flange, said flanges having a rounded juncture with their respective body portions whereby to provide a seal cavity bounded by the convex surfaces of the rounded junctures and compartment wall, and a seal ring located within said detachable means conjointly bearing against the rounded junctures of said flanges and compartment side wall.

JOHN B. DYER.

REFERENCES CITED

The following references are of record in the file of this patent:

UNITED STATES PATENTS

| Number | Name | Date |
| --- | --- | --- |
| 6,408 | Jennison | May 1, 1849 |
| 212,089 | Brady | Feb. 11, 1879 |
| 435,921 | Crockett | Sept. 9, 1890 |
| 463,410 | Weaver | Nov. 17, 1891 |
| 681,433 | Baron | Aug. 27, 1901 |